US012780031B2

(12) United States Patent
Wang et al.

(10) Patent No.: US 12,780,031 B2
(45) Date of Patent: Nov. 3, 2026

(54) CHARGING PILE COORDINATION SYSTEMS, METHODS AND MEDIA

(71) Applicant: XCHARGE ENERGY USA INC., Kyle, TX (US)

(72) Inventors: Junshuai Wang, Kyle, TX (US); Rui Ding, Kyle, TX (US)

(73) Assignee: XCHARGE ENERGY USA INC., Kyle, TX (US)

( * ) Notice: Subject to any disclaimer, the term of this patent is extended or adjusted under 35 U.S.C. 154(b) by 272 days.

(21) Appl. No.: 18/777,515

(22) Filed: Jul. 18, 2024

(65) Prior Publication Data

US 2026/0021736 A1 Jan. 22, 2026

(51) Int. Cl.

| | |
|---|---|
| ***B60L 53/63*** | (2019.01) |
| ***B60L 53/51*** | (2019.01) |
| ***B60L 53/67*** | (2019.01) |
| ***H02J 3/00*** | (2026.01) |
| ***H02J 3/38*** | (2026.01) |
| ***H02J 101/24*** | (2026.01) |
| ***H02J 103/30*** | (2026.01) |
| ***H02S 10/20*** | (2014.01) |
| ***H02S 50/10*** | (2014.01) |

(52) U.S. Cl.

CPC ............... *B60L 53/63* (2019.02); *B60L 53/51* (2019.02); *B60L 53/67* (2019.02); *H02J 3/004* (2020.01); *H02J 3/38* (2013.01); *H02S 10/20* (2014.12); *H02S 50/10* (2014.12); *H02J 2101/24* (2026.01); *H02J 2103/30* (2026.01)

(58) Field of Classification Search

None

See application file for complete search history.

(56) References Cited

U.S. PATENT DOCUMENTS

2021/0276447 A1* 9/2021 Kumar .................... B60L 53/66

FOREIGN PATENT DOCUMENTS

| | | |
|---|---|---|
| CN | 102361334 B | 1/2014 |
| CN | 103793758 B | 1/2017 |
| CN | 104967112 B | 3/2017 |
| CN | 206135505 U | 4/2017 |
| CN | 109713696 B | 9/2020 |
| CN | 106972534 B | 10/2020 |

* cited by examiner

*Primary Examiner* — Sean Shechtman

(74) *Attorney, Agent, or Firm* — METIS IP LLC

(57) ABSTRACT

A charging pile coordination system, method, and medium, the system including: a user terminal provided with a first positioning unit, a plurality of charging piles, an environmental monitoring unit, and a processor. The processor is configured to: for each of the plurality of charging piles, obtain a power generation parameter; determine a predicted efficiency and a confidence level for the predicted efficiency based on the environmental feature and the power generation parameter; determine an amount of power available based on the predicted efficiency, the confidence level for the predicted efficiency, and an amount of power remaining; determine a preferred charging scheduling parameter based on the amount of power available, a charging pile position, and the charging demand; and generate a first scheduling instruction, a second scheduling instruction, and notification information and send them to the plurality of charging piles, the environmental monitoring unit, and the user terminal, respectively.

20 Claims, 5 Drawing Sheets

200

CHARGING PILE COORDINATION SYSTEMS, METHODS AND MEDIA

TECHNICAL FIELD

The present disclosure relates to a field of smart grid, and in particular, to a charging pile coordination system, method, and medium.

BACKGROUND

The charging pile in a residential region is often equipped with a photovoltaic power generation device for a sustainable charging of an electric vehicle. However, as it is difficult to accurately predict a photovoltaic power generation efficiency for each charging pile in the residential region, it is impossible to call a grid in a timely manner for auxiliary charging when required. In addition, when an amount of photovoltaic power generation exceeds an immediate charging demand, an amount of remaining power is often underutilized, which not only results in wasted resources, but also increases a stress on the grid during a high grid load period.

Accordingly, it is desired to provide a charging pile coordination system, method, and medium to improve an accuracy of a power generation efficiency prediction and a utilization rate of the remaining power of a photovoltaic charging pile, as well as to optimize a charging management of the electric vehicles.

SUMMARY

One of the embodiments of the present disclosure provides a charging pile coordination system, including a user terminal provided with a first positioning unit, a plurality of charging piles, an environmental monitoring unit, and a processor. The user terminal is connected to at least one charging pile of the plurality of charging piles; the user terminal is configured to obtain a charging demand of a user and user information; and the first positioning unit is configured to obtain a terminal position of the user terminal. Each of the plurality of charging piles includes a solar power generating unit, an electrical energy storage unit, and a second positioning unit; the second positioning unit is configured to obtain a charging pile position of the charging pile. The environmental monitoring unit is configured to obtain an environmental feature of a region where the charging pile is located. The processor is communicatively connected to the user terminal and the charging pile, and the processor is configured to: for each of the plurality of charging piles, obtain a power generation parameter of the solar power generating unit; determine a predicted efficiency of the solar power generating unit for a preset future time period and a confidence level for the predicted efficiency based on the environmental feature and the power generation parameter; determine an amount of power available from the charging pile for the preset future time period based on the predicted efficiency, the confidence level for the predicted efficiency, and an amount of power remaining in the electrical energy storage unit; determine a preferred charging scheduling parameter based on the amount of power available, the charging pile position, and the charging demand corresponding to the plurality of charging piles; the preferred charging scheduling parameter including a target charging pile and a target charging sequence corresponding to the charging demand; generate a first scheduling instruction, a second scheduling instruction, and notification information based on the preferred charging scheduling parameter; and the first scheduling instruction is configured to set a grid demand power of the plurality of charging piles for the preset future time period; the second scheduling instruction is configured to adjust a monitoring parameter of the environmental monitoring unit; and the notification information includes the target charging pile and the target charging sequence corresponding to the charging demand; and send the first scheduling instruction to the plurality of charging piles, send the second scheduling instruction to the environmental monitoring unit, and send the notification information to the user terminal.

One or more embodiments of the present disclosure provide a charging pile coordination method. The method is performed based on a processor, the method includes: for at least one of a plurality of charging piles: obtaining a power generation parameter of a solar power generating unit in the charging pile and an environmental feature of a region where the charging pile is located; determining a predicted efficiency of the solar power generating unit for a preset future time period and a confidence level for the predicted efficiency based on the environmental feature and the power generation parameter; determining an amount of power available from the charging pile for the preset future time period based on the predicted efficiency, the confidence level for the predicted efficiency, and an amount of power remaining in the electrical energy storage unit; obtaining a charging demand of a user and user information based on a user terminal; obtaining a terminal position of the user terminal based on a first positioning unit in the user terminal; determining a preferred charging scheduling parameter based on the amount of power available, the charging pile position, and the charging demand corresponding to the plurality of charging piles; the preferred charging scheduling parameter including a target charging pile and a target charging sequence corresponding to the charging demand; and sending the first scheduling instruction to the plurality of charging piles, sending the second scheduling instruction to the environmental monitoring unit, and send the notification information to the user terminal.

One or more embodiments of the present disclosure provide a non-transitory computer-readable storage medium storing computer instruction. When reading the computer instructions in the storage medium, a computer executes the charging pile coordination method.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, wherein.

DETAILED DESCRIPTION

Figure 1:
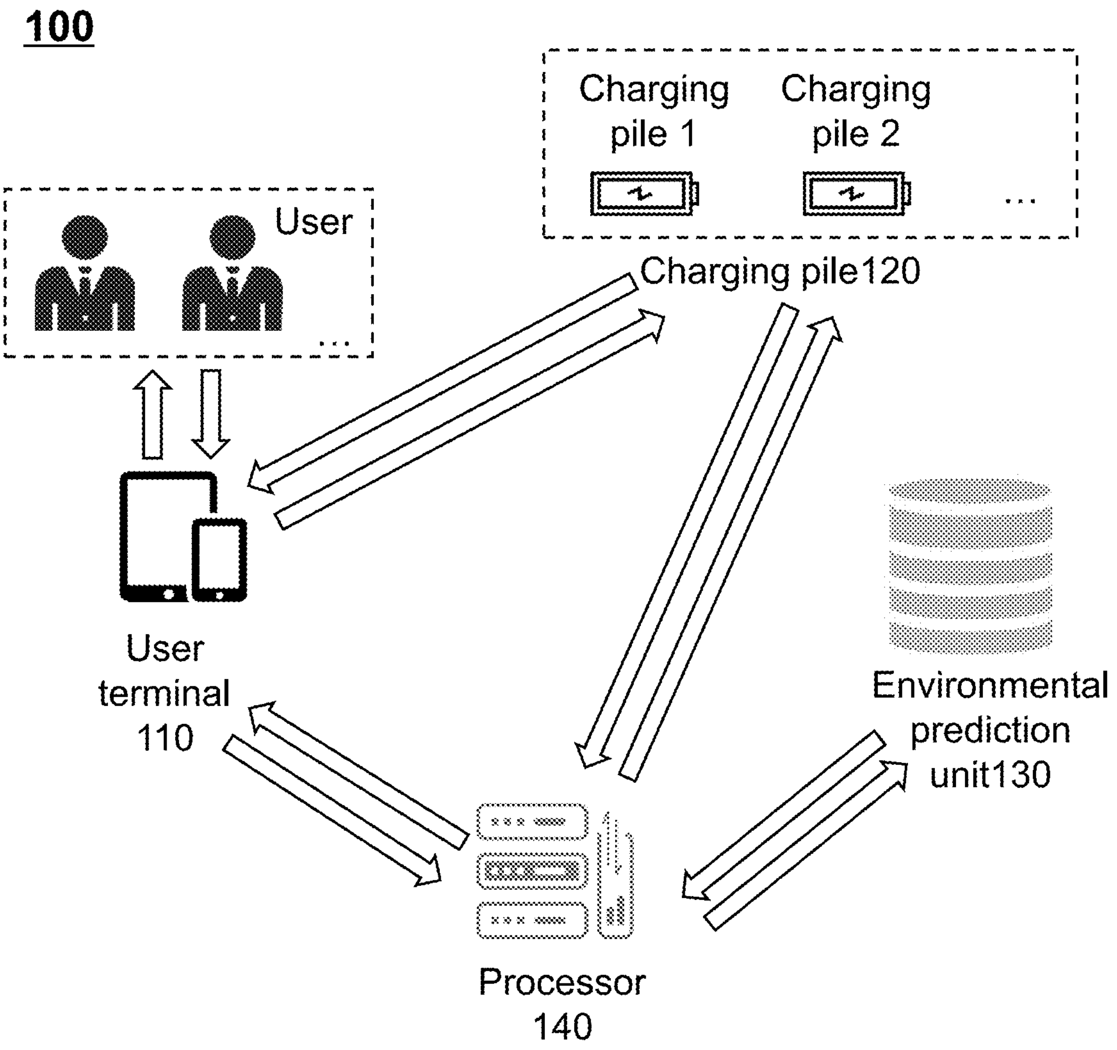
FIG. 1 is a schematic diagram illustrating a charging pile coordination system according to some embodiments of the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios based on the accompanying drawings without creative labor. Unless obviously obtained from the context or the context illustrates otherwise, the same numeral in the drawings refers to the same structure or operation.

It should be understood that as used herein, the terms "system," "device," "unit," and/or "module" as used herein is a way to distinguish between different components, elements, parts, sections, or assemblies at different levels. However, the words may be replaced by other expressions if other words accomplish the same purpose.

As used in the present disclosure and the appended claims, the singular forms "a," "an," and "the" include plural referents unless the content clearly dictates otherwise. Generally, the terms "including" and "comprising" suggest only the inclusion of clearly identified steps and elements that are explicitly identified, but these steps and elements do not constitute an exclusive list, and the method or device may also include other steps or elements.

Flowcharts are used in the present disclosure to illustrate steps performed by a system in accordance with embodiments of the present disclosure. It should be appreciated that the preceding or following steps are not necessarily performed in an exact sequence. Instead, the steps may be processed in reverse order or simultaneously. Also, it is possible to add other operations to these processes or remove a step or steps from them.

To optimize a charging management of electric vehicles in residential regions, an efficiency of charging is ensured while reducing a dependence on a grid when charging. Therefore, for each charging pile, by determining an amount of power available in a future time period, and select a preferred charging scheduling parameter, an overall energy utilization efficiency and charging experience is improved.

In view of the foregoing, in some embodiments of the present disclosure, it is expected to provide a charging pile coordination system, method, and medium. By performing an accurate photovoltaic power generation efficiency prediction for the charging pile equipped with a photovoltaic power generator in the residential region, and assessing a confidence level for the predicted efficiency, the amount of power each charging pile is able to provide is accurately determined. Meanwhile, combining a charging pile position and a charging demand of a user, the preferred charging scheduling parameter is determined to achieve a more efficient charging management, ensuring an establishment of an effective power cycle between a system and a grid supply, and optimizing charging cycles of different electric vehicles.

FIG. 1 is a schematic diagram illustrating a charging pile coordination system according to some embodiments of the present disclosure.

In some embodiments, a charging pile coordination system 100 may include a user terminal 110 provided with a first positioning unit, a charging pile 120, an environmental prediction unit 130, and a processor 140.

The user terminal 110 refers to an operating terminal of one or more charging piles disposed in a plurality of buildings in a residential region. In some embodiments, the user terminal is used to enable a user to log in and perform a reservation operation. For example, the user terminal may be a smartphone application, a touchscreen operation interface that comes with the charging pile, etc.

In some embodiments, the user terminal is connected to at least one of the plurality of charging piles.

In some embodiments, the user terminal is configured to obtain a charging demand of the user, as well as user information.

In some embodiments, the user terminal is further configured to issue a charging pile request instruction. More contents about the charging pile request instruction may be found in FIG. 3 and its related descriptions.

A first positioning unit is a component deployed within the user terminal that sends a terminal position of the user terminal to the processor. For example, the first positioning unit may be a GPS module, a Bluetooth positioning module, etc. In some embodiments, the first positioning unit is configured to obtain a terminal position of the user terminal.

The charging pile 120 refers to a device for supplying power to an electric vehicle. There may be a plurality of charging piles. In some embodiments, each charging pile may include a solar power generating unit, an electrical energy storage unit, and a second positioning unit.

In some embodiments, the charging pile is further configured to: during a preset self-test time period, feedback the power self-test result to the processor in accordance with a preset self-test cycle corresponding to the preset self-test time period. The preset self-test cycle of the each charging pile during the preset self-test time period is related to a historical grid demand power of the charging pile. More contents about this section may be found in FIG. 5 and its related descriptions.

The solar power generating unit is a device that directly converts a solar radiation energy into the electrical energy. For example, the solar power generating unit may include, but not limited to, a solar panel, a cable, etc. In some embodiments, the electrical energy converted by the solar power generating unit is used to supply power for the corresponding charging pile, thereby charging the electric vehicle.

The electrical energy storage unit refers to a device for storing the electrical energy. For example, the electrical energy storage unit may be a lithium-ion battery, a capacitor, etc.

The second positioning unit refers to a component that sends a charging pile position to the processor. In some embodiments, the second positioning unit is configured to obtain the charging pile position of the charging pile.

Environmental monitoring unit 130 refers to a component that is used to monitor an environmental situation in a region where the charging pile is located. In some embodiments, the environmental monitoring unit may include, but not limited to, a light sensor, a temperature sensor, a humidity sensor, and a camera unit.

In some embodiments, the environmental monitoring unit is configured to obtain an environmental feature of the region where the charging pile is located. The environmental feature may include, but not limited to, a light intensity sequence, a cloud information sequence, a temperature information sequence, a precipitation information sequence, etc.

The processor 140 may process information and/or data related to the charging pile coordination system 100 to perform one or more of the functions described in this embodiment. In some embodiments, the processor may include one or more processing engines (e.g., a single-chip processing engine or a multi-chip processing engine). Merely by way of example, the processor 160 may include a central processing unit (CPU), an application-specific integrated circuit (ASIC), or any combination of the above.

In some embodiments, the processor is communicatively coupled to the user terminal and the charging pile.

In some embodiments, the processor is configured to: for each of the plurality of charging piles, obtain a power generation parameter of the solar power generating unit; determine a predicted efficiency of the solar power generating unit for a preset future time period and a confidence level for the predicted efficiency based on the environmental feature and the power generation parameter; determine an amount of power available from the charging pile for the preset future time period based on the predicted efficiency the confidence level for the predicted efficiency, and an amount of power remaining in the electrical energy storage unit; determine a preferred charging scheduling parameter based on the amount of power available, the charging pile position, and the charging demand corresponding to the plurality of charging piles; generate a first scheduling instruction, a second scheduling instruction, and notification information based on the preferred charging scheduling parameter; and send the first scheduling instruction to the plurality of charging piles, send the second scheduling instruction to the environmental monitoring unit, and send the notification information to the user terminal.

In some embodiments, the processor is further configured to: determine a charging distance between the each charging pile and the user corresponding to the each charging demand based on the user position and the charging pile positions of the plurality of charging piles; determine a charging priority of each charging demand at the each charging pile based on the amount of power available corresponding to the each charging pile and the charging distance; and determine the target charging pile and the target charging sequence for the each charging demand based on the charging priority of the each charging demand at the each charging pile.

In some embodiments, the processor is further configured to: determine a completion degree and completion efficiency of the charging demand in a candidate charging scheduling parameter based on the charging priority of the charging demand through a charging scheduling model; the charging scheduling model being a machine learning model; and determine the preferred charging scheduling parameter based on the candidate charging scheduling parameter, and the completion degree and completion efficiency of the each charging demand in the candidate charging scheduling parameter.

In some embodiments, the processor is further configured to: in response to receiving a charging pile request instruction from the user terminal, send a power self-test instruction to the target charging pile in the charging pile request instruction.

In some embodiments, the processor is further configured to: in response to the charging pile request instruction, send the power self-test instruction to a candidate charging pile.

In some embodiments, the processor is further configured to: obtain a power self-test result fed back from the charging pile; determine a first charging pile and a second charging pile based on the power self-test result; generate a demand power adjustment instruction and/or a reverse power supply instruction; and send the demand power adjustment instruction to the first charging pile and/or send the reverse power supply instruction to the second charging pile.

In some embodiments, the processor is further configured to: determine a first threshold and a second threshold based on a current power supply to the each charging pile and an environmental feature sequence by a threshold prediction model.

For more contents about the relevant function of each of the above modules, please refer to FIGS. 2-5 and the related descriptions.

In some embodiments in the present disclosure, based on a coordinated operation of various modules in the charging pile coordination system 100, a utilization of a renewable energy is promoted, a charging cost is reduced, and a better charging experience is provided to the user.

It should be noted that the above description of the charging pile coordination system and the modules are provided only for descriptive convenience, and does not limit the present disclosure to the scope of the cited embodiments.

Figure 2:
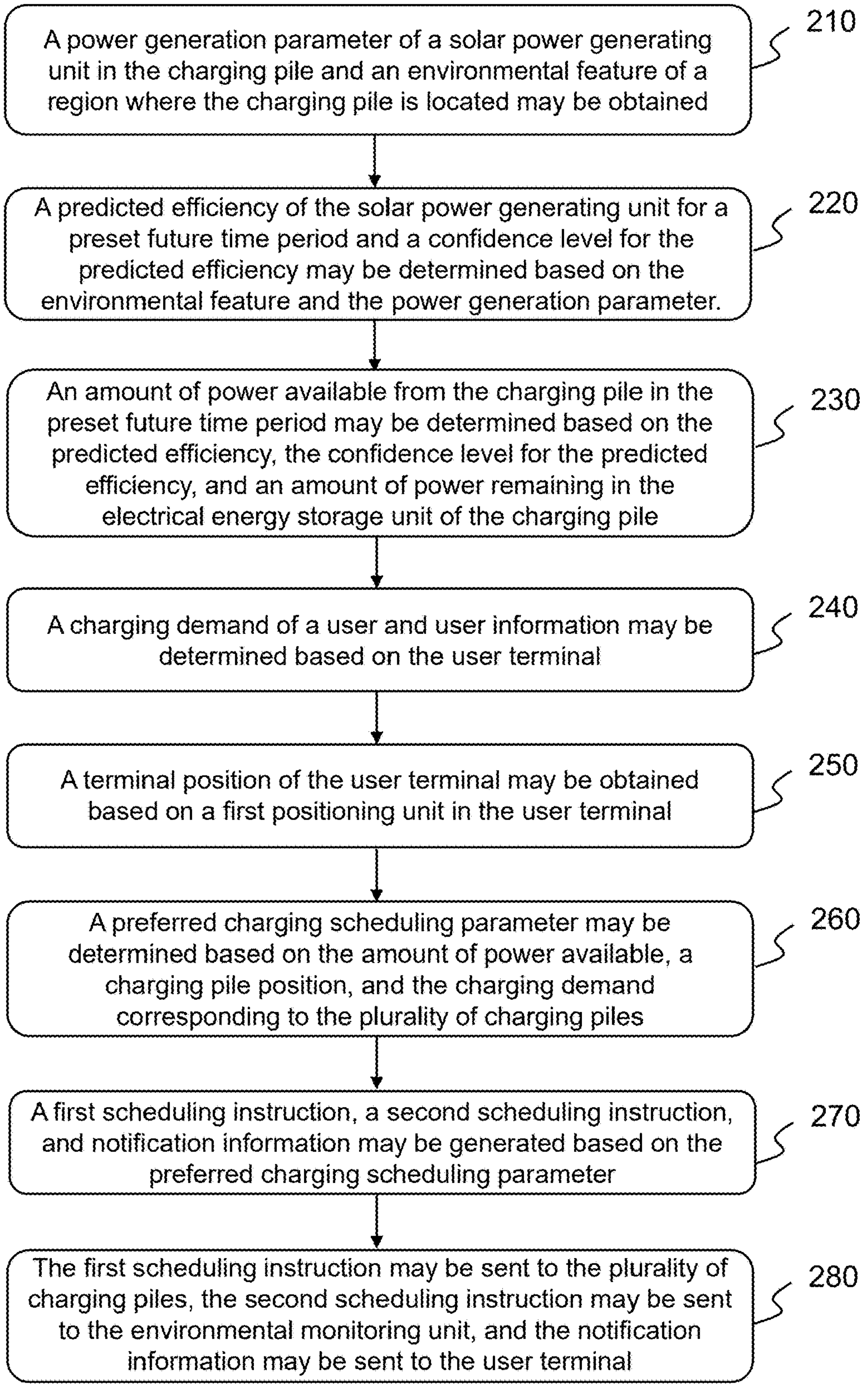
FIG. 2 is a flowchart illustrating an exemplary charging pile coordination method according to some embodiments of the present disclosure.

FIG. 2 is a flowchart illustrating an exemplary charging pile coordination method according to some embodiments of the present disclosure. As shown in FIG. 2, a process 200 includes the following steps. In some embodiments, the process 200 may be executed by a processor.

In 210, a power generation parameter of a solar power generating unit in the charging pile and an environmental feature of a region where the charging pile is located may be obtained.

The power generation parameter of the solar power generating unit refers to an indicator used to describe a performance of the solar power generating unit. For example, the solar power generating unit may be a solar photovoltaic power generation array, and the power generation parameter may include a photovoltaic module parameter, and a photovoltaic array parameter.

The photovoltaic module parameter refers to a parameter describing the performance of an individual photovoltaic module for evaluating a power generating capacity of the photovoltaic module. In some embodiments, the photovoltaic module parameter may include, but not limited to, a peak power, a maximum power point voltage, a maximum power point current, and a temperature coefficient, etc.

The peak power refers to a maximum power that the photovoltaic module is capable of outputting under a standard test condition. The standard test condition refers to a group of uniform experimental conditions for evaluating and comparing the performance of the photovoltaic module. The maximum power point voltage refers to a voltage of the photovoltaic module at maximum output power. The maximum power point current refers to a current of the photovoltaic module at maximum output power. The temperature coefficient refers to a rate of change of the photovoltaic module output power with a temperature change.

The photovoltaic array parameter refers to a parameter that describes the performance of a photovoltaic power generation array. The photovoltaic power generation array refers to an array including a plurality of photovoltaic modules. In some embodiments, the photovoltaic array parameter may include, but not limited to, a tilt angle and a facing angle of the photovoltaic power generation array, an array efficiency, a shading coefficients of the array, etc.

The tilt angle refers to a tilt angle relative to a horizontal plane when the photovoltaic power generation array is installed. The facing angle refers to an angle toward the sun when the photovoltaic power generation array is installed. The array efficiency refers to an efficiency of the photovoltaic power generation array converting a solar energy into electricity. The shading coefficient of the array refers to a ratio of an area of the photovoltaic power generation array in shadow to a total area of the photovoltaic power generation array. The shadow refers to a region of the photovoltaic power generation array that do not receive sunlight (or receive only very weak light) due to objects blocking the sunlight.

In some embodiments, the processor may be communicatively coupled to the charging pile to obtain the power generation parameters of the solar power generating unit within each charging pile.

The environmental feature refers to a feature related to the environment of the region where the charging pile is located. In some embodiments, the environmental feature may include, but not limited to, a light intensity sequence, a cloud information sequence, a temperature information sequence, and a precipitation information sequence.

The light intensity sequence refers to a sequence consisting of light intensity in the region where the charging pile is located. In some embodiments, the light intensity sequence may include a plurality of moments within a period and the light intensity corresponding to each moment. For example, the light intensity sequence may be represented by [(t1,s1), (t2,s2), (t3,s3), . . . , (tn,sn)]. The sn denotes the light intensity corresponding to the region where the charging pile is located at the moment tn.

The cloud information sequence, the temperature information sequence and the light intensity sequence are similar, with a difference that the cloud information sequence includes a cloud area and a cloud moving speed at each moment, and the temperature information sequence includes an environmental temperature at each moment.

The cloud area and the cloud moving speed may be obtained by analyzing a cloud image obtained by a camera unit in the environmental monitoring unit. The period corresponding to the sequence and the moments in the sequence may adopt preset values, such as one period being a day or a week, one moment being an hour, etc.

The precipitation information sequence refers to a sequence consisting of daily precipitation in the region where the charging pile is located in each period. In some embodiments, the precipitation information sequence may include a daily precipitation time period. For example, the precipitation information sequence may be represented by [(f1,l1), (f2,l2), (f3,l3), . . . , (fn,ln)], where fn denotes a moment of start of daily precipitation in the region where the charging pile is located, ln denotes the moment of the end of precipitation, and (fn,ln) denotes a time period during which the precipitation lasts.

In some embodiments, the processor may obtain the environmental feature of the region where each charging pile is located based on the environmental monitoring unit. For more contents on the environmental feature, please refer to FIG. 5 and its related descriptions.

In 220, a predicted efficiency of the solar power generating unit for a preset future time period and a confidence level for the predicted efficiency may be determined based on the environmental feature and the power generation parameter.

The preset future time period refers to a preset time period for predicting and evaluating the performance of the solar power generating unit in the future. For example, the preset future time period may be a day in the future, a month in the future, etc. In some embodiments, the preset future time period may be set by a skilled professional or by a system default.

The predicted efficiency refers to an amount of electrical power produced by a photovoltaic array when exposed to sunlight.

In some embodiments, the processor may determine the predicted efficiency in multiple manners. Exemplarily, the processor may determine the predicted efficiency based on the following manners. In some embodiments, the processor may construct a photovoltaic power generation efficiency change curve based on the light intensity sequence, the array efficiency, the shading coefficient, the tilt angle, and the facing angle of the array during the current and a plurality of historical periods, and then determine, based on the photovoltaic power generation efficiency change curve, the predicted efficiency for the preset future time period.

The photovoltaic power generation efficiency change curve refers to a curve that is used to determine the predicted efficiency for the preset future time period. In some embodiments, the processor may construct the photovoltaic power generation efficiency curve in the following manner.

Step 11, the processor may determine a standard efficiency curve based on the array efficiency, a standard light value, and a standard temperature.

The standard light value refers to a value of a standard level of solar radiation intensity at a time of operation of the solar power generating unit. In some embodiments, the standard light value may be preset empirically, and exemplarily, the standard light value may be 1,000 watts per square meter. The standard temperature refers to a standard environment temperature level value for the operation of the solar power generating unit. In some embodiments, the standard temperature may be preset empirically, and exemplarily, the standard temperature may be 25° C.

The standard efficiency curve refers to an efficiency curve obtained by testing the photovoltaic array under the standard test condition (i.e., the standard light value and the standard temperature). In some embodiments, a horizontal coordinate of the standard efficiency curve is a plurality of sampling moment points, and a vertical coordinate is the predicted efficiency of the photovoltaic power generation array under the standard test condition. A sampling frequency of the standard efficiency curve may be greater than a sampling frequency of the light intensity sequence.

Step 12, the processor may determine the cloud information sequence and a light intensity sequence for the preset future time period based on the current environmental feature and the environmental feature in a plurality of historical periods, the temperature information sequence for a preset future time period, and the precipitation information sequence for the preset future time period.

In some embodiments, the temperature information sequence and the precipitation information sequence for the preset future time period may be obtained based on a weather forecast.

In some embodiments, the processor may determine a correspondence between a change trend of the cloud information sequence for the current and plurality of historical periods, and a change trend of the temperature information sequence for the current and the plurality of historical periods based on the two change trends. Then, based on the change trend of the temperature information sequence for the preset future time period and the foregoing correspondence, the processor may predict the cloud information sequence for the preset future time period.

In some embodiments, a manner for determining the light intensity sequence during the preset future time period is similar to the manner of determining a cloud information sequence, which is not repeated herein.

Step 13, the processor may determine a series of shading coefficients for the preset future time period based on the cloud information sequence for the preset future time period and the precipitation information sequence for the preset future time period.

A shading coefficient sequence refers to a sequence consisting of the shading coefficients of the photovoltaic power generation array at a plurality of moments.

In some embodiments, the processor may determine an area of the photovoltaic power generation array that is in shadow at a certain moment based on the moment in the shading coefficient sequence according to the cloud area at the moment, and whether the moment is within a precipitation duration period. In some embodiments, the processor may determine a ratio value of the area of the photovoltaic power generation array in the shadow to the total area of the photovoltaic power generation array, and obtain the shading coefficient of the photovoltaic power generation array for that moment. Then the shading coefficient sequence for the photovoltaic power generation array refers to a set of shading coefficients corresponding to the plurality of moments.

Step 14, the processor may determine the predicted efficiency of the photovoltaic array based on the standard efficiency curve, the shading coefficient sequence for the preset future time period, the light intensity sequence for the preset future time period, the temperature information sequence for the preset future time period, the precipitation information sequence for the preset future time period and the tilt angle and the facing angle of the photovoltaic array.

In some embodiments, the processor may construct a feature vector based on the standard efficiency curve, the shading coefficient sequence for the preset future time period, the light intensity sequence for the preset future time period, the temperature information sequence for the preset future time period, the precipitation information sequence for the preset future time period, and the tilt angle and the facing angle of the photovoltaic array.

A vector database contains a plurality of reference vectors and the predicted efficiency of the solar power generating unit corresponding to each of the plurality of reference vectors.

The reference vector is constructed based on the standard efficiency curve of the solar power generating unit, the shading coefficient sequence of the solar power generating unit during a historical time period, the light intensity sequence during the historical time period, the temperature information sequence during the historical time period, the precipitation information sequence during the historical time period, and the tilt angle and the facing angle of the photovoltaic array. A reference predicted efficiency corresponding to the reference vector is an actual efficiency of the corresponding solar power generating unit during the historical time period.

The reference vector is constructed in the same way as the feature vector.

In some embodiments, the processor may determine a similarity between the reference vector and the feature vectors separately to determine the predicted efficiency corresponding to the feature vector. For example, the reference vector whose similarity with the feature vector satisfies a preset condition is taken as a target vector, and the reference predicted efficiency corresponding to the target vector is taken as the predicted efficiency corresponding to the feature vector. The preset condition may be determined as appropriate. For example, the preset condition may be that the similarity is greater than a preset similarity threshold, etc. The similarity between the reference vector and the feature vector may be negatively correlated to a vector distance between the reference vector and the feature vector, which is determined based on, for example, a cosine distance.

The confidence level for the predicted efficiency refers to a measurement of confidence for the predicted efficiency, i.e., it expresses a degree of certainty about the predicted efficiency, usually in a form of a percentage or a probability.

In some embodiments, the processor may determine an average of the similarities between the matched target vector and the feature vector as the confidence level for the predicted efficiency.

In 230, an amount of power available from the charging pile in the preset future time period may be determined based on the predicted efficiency, the confidence level for the predicted efficiency, and an amount of power remaining in the electrical energy storage unit of the charging pile.

The amount of power remaining refers to an amount of electrical energy in the electrical energy storage unit that is currently unused or unconsumed. In some embodiments, the processor may obtain the amount of power remaining in real time by monitoring a change in the amount of power in the electrical energy storage unit.

The amount of power available refers to an amount of power available by the charging pile during a preset future time period. In some embodiments, the amount of power available includes a photovoltaic power generation of the charging pile during the preset future time period and the power remaining in the electrical energy storage unit. The photovoltaic power generation refers to a total amount of electrical energy produced by the solar power generating unit in the charging pile in a preset future time period (e.g., a day, a month, or a year), which is usually measured in kilowatt-hours (kWh).

In some embodiments, the processor may determine, based on the predicted efficiency, the confidence level of the predicted efficiency, and the power remaining in the electrical energy storage unit of the charging pile, the power available from the charging pile for a preset future time period, in multiple ways.

For example, the processor may determine, based on the predicted efficiency, a maximum power generated by the solar power generating unit of each charging pile, the predicted efficiency of each charging pile for the preset future time period; and adjust, based on the confidence level of the predicted efficiency, the predicted efficiency within a confidence range of the predicted efficiency to obtain an actual predicted efficiency.

In some embodiments, in response to a difference between two end values in the confidence range being greater than a first difference threshold, the predicted efficiency corresponding to the target vector with the highest similarity is selected as the actual predicted efficiency for the preset future time period. Alternatively, after removing the target vector with the lowest similarity, and then an average of the light predicted efficiencies corresponding to the remaining target vectors is taken as the actual predicted efficiency. The first difference threshold refers to a threshold for determining whether to adjust the predicted efficiency, which is set by a professional or by a system default.

The processor may determine the amount of power available based on the actual predicted efficiency and the amount of power remaining in the electrical energy storage unit of the charging pile. The confidence range refers to a range of interval to which the confidence level of the predicted efficiency belongs. In some embodiments, the interval to which the confidence level belongs refers to an interval where a true value range of the confidence level of the predicted efficiency. For example, the interval to which the confidence level belongs may be a range of reference predicted efficiency corresponding to the target vector.

In some embodiments, the processor may perform the above steps 210 to 230 separately for each charging pile to obtain the amount of power available for each charging pile during the preset future time period.

In 240, a charging demand of a user and user information may be obtained based on the user terminal.

The charging demand refers to information related to charging an electric vehicle. For example, the charging demand may include, but not limited to, a demand power, an amount of power remaining of the electric vehicle, and an electric vehicle travel period.

The demand power refers to an amount of power required to fully charge the electric vehicle or to charge to a target power level. In some embodiments, the demand power may be set manually by the user. In some embodiments, the processor may also obtain the demand power based on the amount of power remaining of the electric vehicle by calculation.

The amount of power remaining of the electric vehicle refers to an amount of power remaining in the current electric vehicle.

The electric vehicle travel time period refers to a time associated with an electric vehicle travel. For example, an electric vehicle travel time period may include a parking time period for the electric vehicle, a moment of departure of the electric vehicle, etc.

The user information refers to information related to the user of an electric vehicle. For example, the user information may include, but not limited to, a user position, an electric vehicle parking position, a charging time period preference, and a habitual charging pile.

In some embodiments, after each user logs in, the processor statistically records the charging pile and the charging time period of each charging time of the user, so as to obtain a collection of commonly used charging periods and the habitual charging pile of the user.

Figure 3:
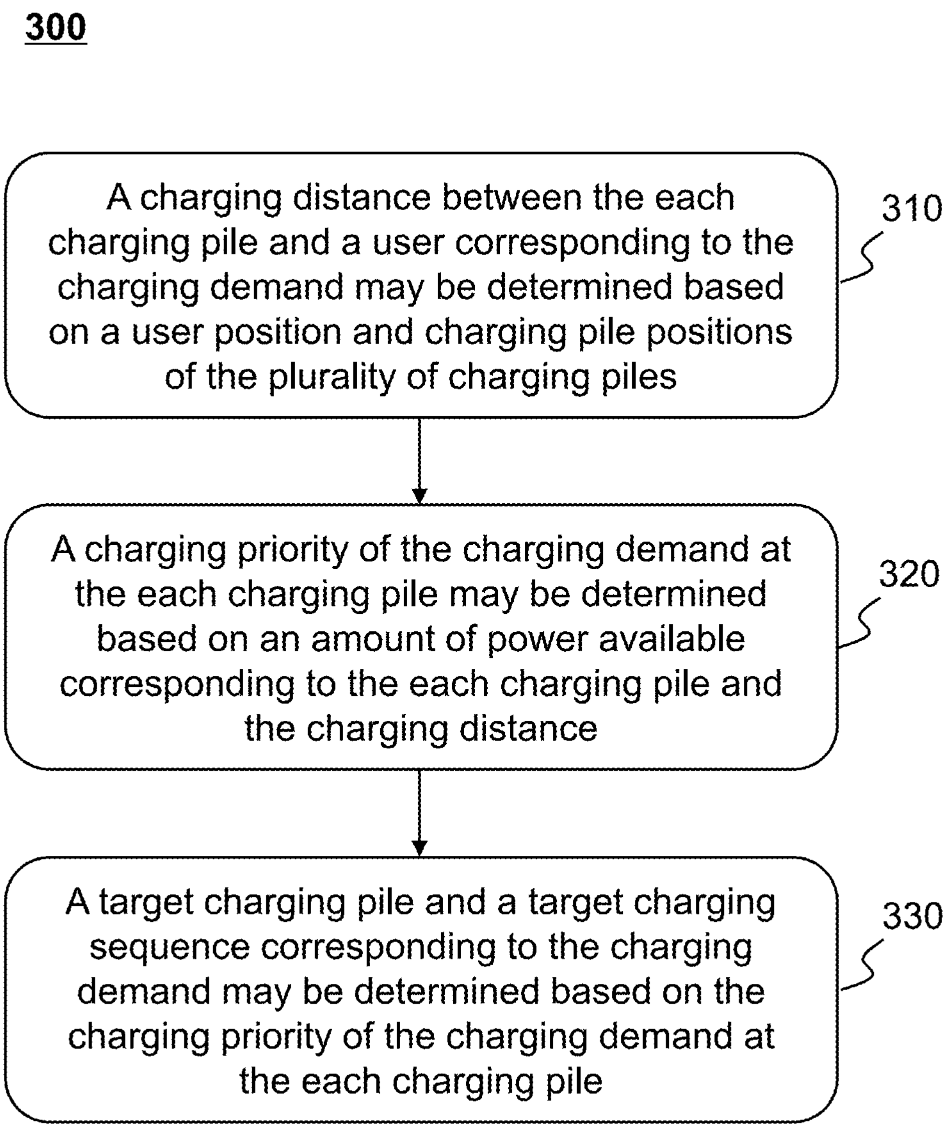
FIG. 3 is a flowchart illustrating an exemplary process for determining a preferred charging scheduling parameter according to some embodiments of the present disclosure.

For more contents about the user information, please refer to FIG. 3 and the associated descriptions.

In 250, a terminal position of the user terminal may be obtained based on a first positioning unit in the user terminal.

The terminal position refers to a location where the user terminal is located. For example, the terminal position may be expressed in latitude and longitude.

Step 260, a preferred charging scheduling parameter may be determined based on the amount of power available, a charging pile position, and the charging demand corresponding to the plurality of charging piles.

The charging pile position refers to a geographic position where the charging pile is located. In some embodiments, the processor may use the second positioning unit to obtain the charging pile position.

The preferred charging scheduling parameter refers to a scheduling parameter for charging demand within a residential region. For example, the preferred charging scheduling parameter includes the target charging pile that the electric vehicle needs to travel to for each charging demand and a target charging sequence for each charging demand in the target charging pile.

In some embodiments, the processor may determine the preferred charging scheduling parameter based on the amount of power available from the plurality of charging piles, the pile position, and the charging demand in multiple ways. For example, the processor may assign, based on the pile position and the charging demand, each user to the charging pile with the shortest distance from the user position among the charging piles whose amount of power available satisfies the demand power (i.e., as the target charging pile), and the processor may further determine, based on an available charging plan at the target charging pile and an initiating moment of each charging demand or a preset charging start moment, etc., a target charging sequence for the charging demand of each user at the target charging pile.

For more contents on how to determine the preferred charging scheduling parameter, please refer to FIG. 3 and associated descriptions thereof.

In 270, a first scheduling instruction, a second scheduling instruction, and notification information may be generated based on the preferred charging scheduling parameter.

The first scheduling instruction refers to a grid demand power distribution instruction for the plurality of charging piles for the preset future time period.

The grid demand power refers to a total power required by the charging pile at the grid during the preset future time period, i.e., the power that is required to be provided by the grid to the charging pile. In some embodiments, the processor may determine the grid demand power by formular (1). The first preset algorithm is as follows:

$$P=(R-Q)\div T \tag{1}$$

where, P denotes the grid demand power; R denotes the demand power, Q denotes the amount of power available, and T denotes a duration of the preset future time period.

The second scheduling instruction refers to a monitoring parameter adjustment instruction for the environmental monitoring unit.

The monitoring parameter refers to a parameter associated with the monitoring of the environmental monitoring unit. For example, the monitoring parameter may include, but not limited to, a monitoring range a monitoring frequency, etc. of the environmental monitoring unit. In some embodiments, the processor may obtain the monitoring parameter by obtaining a sensor in the environmental monitoring unit.

The notification information refers to information sent to the user terminal. For example, the notification information may include the target charging pile corresponding to the charging demand and a charging sequence of the target charging pile.

In 280, the first scheduling instruction may be sent to the plurality of charging piles, the second scheduling instruction may be sent to the environmental monitoring unit, and the notification information may be sent to the user terminal.

In the charging pile coordination method provided in some embodiments of the present disclosure, a future power generation efficiency and confidence level is predicted by obtaining the solar power generation parameter and the environmental feature, and the amount of power available is determined in conjunction with the amount of power remaining. Based on the user's charging demand and the terminal position, the preferred charging scheduling parameter is determined, the scheduling instruction and the notification information are generated and sent, thereby realizing an efficient and intelligent charging management, and improving a charging efficiency and user experience.

It should be noted that the foregoing description of the process 200 is intended to be merely exemplary and illustrative without limiting the scope of application of the present disclosure. For those skilled in the art, various corrections and changes may be made to the process 200 under the guidance of the present disclosure. However, these corrections and changes remain within the scope of the present disclosure.

FIG. 3 is a flowchart illustrating an exemplary process for determining a preferred charging scheduling parameter according to some embodiments of the present disclosure.

In 310, a charging distance between the each charging pile and a user corresponding to the charging demand may be determined based on a user position and charging pile positions of the plurality of charging piles.

In some embodiments, the processor 140 may determine a shortest path distance from the user position to the charging pile position of each of the charging piles 120, and determine the shortest path distance as a charging distance between the corresponding charging pile position and the user position.

In some embodiments, the processor 140 may determine the charging distance based on querying a first preset table. In some embodiments, the user may upload user position information during a first registration, and any subsequent processor may utilize the user position information as the user position for calculating the charging distance to simplify a subsequent user input. If the user needs to modify the user position for a particular charging demand, the user may select to add a new user position and specify whether the new position is only for the current charging demand or whether the new position is used for subsequent charging demands.

The processor 140 may construct the first preset table based on a count of the charging pile and the user count corresponding to the user's need. The first preset table contains the shortest path distances between different charging piles and the user positions corresponding to the user counts.

In 320, a charging priority of the charging demand at the each charging pile may be determined based on an amount of power available corresponding to the each charging pile and the charging distance.

The charging priority refers to a priority of each charging demand in different charging piles. In some embodiments, the charging priority may be a numerical value, and a greater value indicates a higher priority.

In some embodiments, the charging priority of the charging demand at each charging pile may be stored in a form of a priority table, the priority table including charging piles within a charging demand range and the corresponding charging priorities. The charging demand range refers to a range of a target user corresponding to the charging demand is able to reach, and the charging demand range may be determined based on priori experience.

In some embodiments, the charging priority may be positively correlated to the amount of power available corresponding to the charging pile 120 and negatively correlated to the charging distance corresponding to the charging pile 120. For example, for a charging demand A, the more amount of power available at a charging pile B and the closer the charging distance, the higher the charging priority of the charging demand A at the charging pile B is.

In some embodiments, the processor may determine the charging priority of the charging demand at the charging pile by means of formula (2):

$$F_{ij} = \alpha_{ij} \times P_i + \frac{\beta_{ij}}{D_{ij}} \quad (2)$$

where $F_{ij}$ denotes the charging priority of the jth charging demand at the ith charging pile, $P_i$ denotes the amount of power available at the ith charging pile, $D_{ij}$ denotes the charging distance corresponding to the jth charging demand at the ith charging pile, $\alpha_{ij}$ and $\beta_{ij}$ denote the power coefficient and the distance coefficient of the ith charging pile for the jth charging demand, respectively. The power coefficient $\alpha_{ij}$ and the distance coefficient $\beta_{ij}$ may be determined based on a priori experience.

In some embodiments, the processor may determine, based on the amount of power available at the ith charging pile and an amount of charging demand for the jth charging demand, the power coefficient $\alpha_{ij}$ of the ith charging pile on the jth charging demand through a preset correlation of the amount of power available coefficient.

The preset correlation of the amount of power available coefficient may be as follows: when the amount of power available at the ith charging pile is not less than the amount of charging demand of the jth charging demand, the power coefficient $\alpha_{ij}$ may be a ratio of the photovoltaic power generation of the charging pile for the preset future time period to the jth charging demand; when the amount of power available at the ith charging pile is less than the amount of charging demand of the jth charging demand, the power coefficient ay may be the ratio of the amount of power available at the ith charging pile to the amount charging demand of the jth charging demand.

For more contents about the photovoltaic power generation of the charging pile for the preset future time period, please refer to FIG. 2 and its related descriptions.

In 330, a target charging pile and a target charging sequence corresponding to the charging demand may be determined based on the charging priority of the charging demand at the each charging pile.

The target charging pile corresponding to the charging demand refers to a finalized charging pile that supplies power for the charging demand.

The target charging sequence corresponding to the charging demand refers to a charging sequence of the charging demand at the target charging pile.

In some embodiments, for a particular charging demand, the processor may sort charging piles within the charging demand range based on charging priority from highest to lowest, select the charging pile with the highest sorting and determine whether the charging pile satisfies an acceptance condition. If the acceptance condition is satisfied, the charging demand is distributed to the charging pile, i.e., the charging pile is used as the target charging pile for the charging demand; if the acceptance condition is not satisfied, the charging pile is removed from the sorting, and the charging pile with the next highest priority is selected for determining whether it satisfies the acceptance condition. The above steps are repeated until the current charging demand distribution is completed.

The processor may accomplish the distribution of the target charging piles for all charging demands in the manner described above, and the processor may use the charging sequence of the charging demands at the target charging piles as the target charging sequence of the charging demands. The charging sequence of the charging demands at the target charging piles may be determined based on the charging priority of the charging demands at the target charging piles, e.g., the higher the charging priority, the more preferred the corresponding charging order.

The acceptance condition refers to a condition that determines whether the current charging pile accepts the charging demand. In some embodiments, in order to avoid a situation that the same charging pile needs to satisfy too many charging demands, which leads to a delay in the charging demands that sorted later, the acceptance condition may be that the count of charging demands for the current charging pile as the target charging pile does not exceed a preset count threshold.

In some embodiments, the processor 140 may, in response to receiving a charging pile request instruction from the user terminal, send a power self-test instruction to the target charging pile in the charging pile request instruction.

The charging pile request instruction refers to an instruction issued by the user terminal requesting the charging pile 120 to perform a charging operation. In some embodiments, the charging pile request instruction may include the charging demand and determining the target charging pile.

The power self-test instruction refers to an instruction for the charging pile 120 to perform a correction check on its own power storage. In some embodiments, in response to receiving the power self-test instruction, the target charging pile may perform a power self-test on the amount of power remaining in its own electrical energy storage unit and feedback the power self-test result to the processor to allow the processor to obtain a more accurate power result to facilitate the provision of subsequent services for the user. For example, the processor may determine, based on the power self-test result, whether the target charging pile is normal or whether it needs to be charged based on the grid in advance, etc.

In some embodiments of the present disclosure, as frequent power self-tests tend to consume power and arithmetic, there is often a lag in the amount of power remaining result. By performing an amount of power remaining self-test before the target user travels to a target charging pile through the power self-test instruction, the accuracy of the amount of power remaining results and the consumption of power and arithmetic may be balanced.

In some embodiments, the processor may also send the power self-test instruction to a candidate charging pile in response to the charging pile request instruction.

The candidate charging pile refers to an alternative charging pile for supplying power. For example, as the target user is likely to temporarily change the target charging pile for personal reasons, it is necessary to determine the charging pile in a vicinity of the target charging pile as the candidate charging pile to facilitate a charging pile replacement by the target user.

In some embodiments, the processor may determine other charging piles within a preset distance threshold from the target charging pile as the candidate charging pile.

In some embodiments, the preset distance threshold may be correlated to a count of habitual charging piles of the target user. For example, the preset distance threshold may be positively correlated to the count of habitual charging piles of the target user. The smaller the count of habitual charging piles, the more the target user is preferred to go to a fixed charging pile for charging, and the smaller a possibility of replacing the charging pile. Therefore, the preset distance threshold may be properly reduced to reduce a count of candidate charging pile need to perform the power self-test, and vice versa.

In some embodiments of the present disclosure, by determining the candidate charging pile and sending the power self-test instruction to the candidate charging pile, the charging pile may be replaced in a timely manner when the target user needs to replace the charging pile after traveling to the target charging pile for personal reasons or for other reasons (e.g., an abnormality of the target charging pile, a region in which the target charging pile is located is occupied, etc.), so as to guarantee a charging experience of the target user.

In some embodiments of the present disclosure, by determining the target charging pile and the target charging sequence for each charging demand based on the charging priority of each charging demand at each charging pile, a movement distance of the target user as well as a power supply capacity of the charging pile may be balanced, thereby avoiding a situation in which a great amount of users concentrating at some charging piles for charging while no target user charging at the other charging piles, thereby optimizing a utilization rate of the charging piles and realizing an efficient distribution of charging demands.

Figure 4:
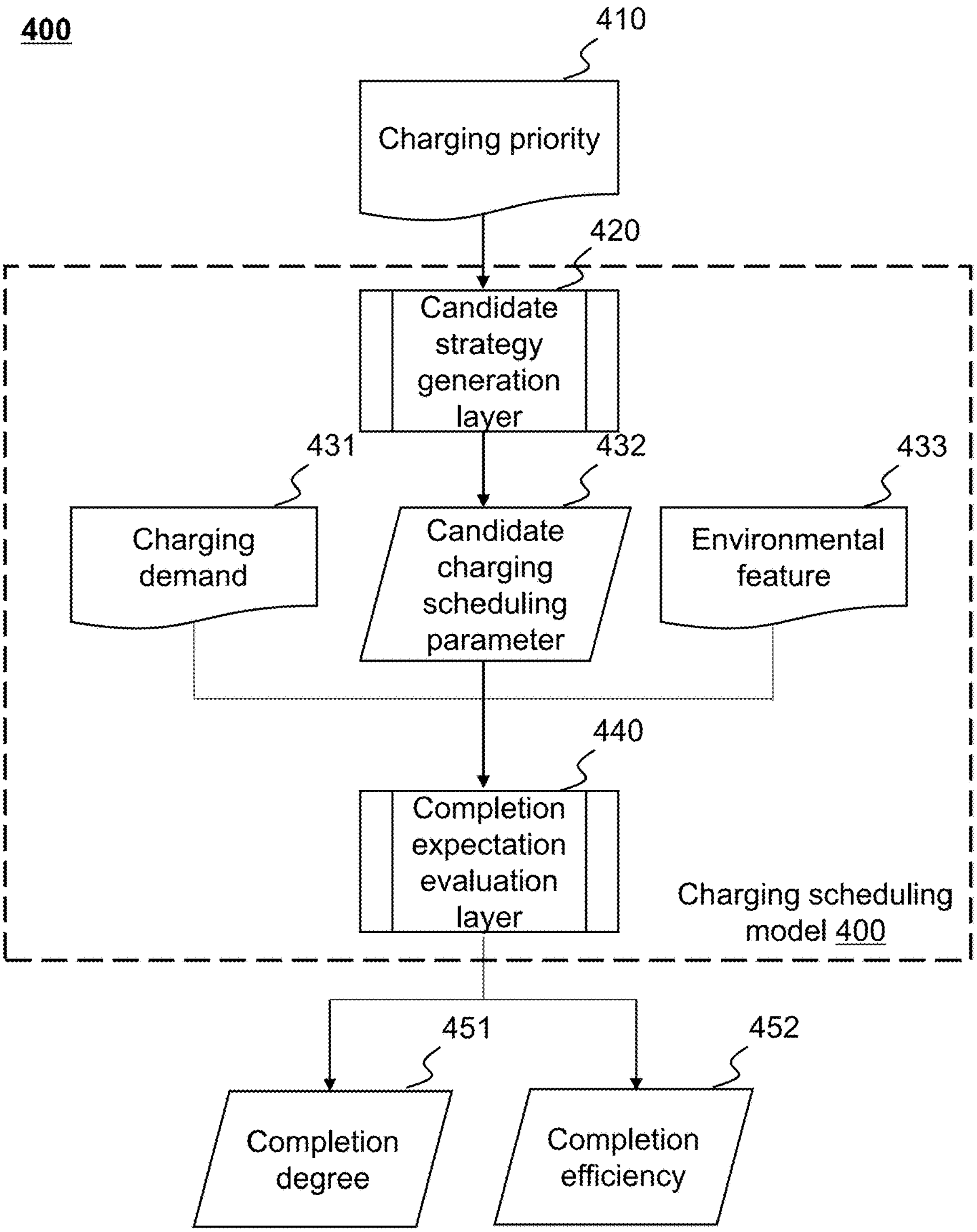
FIG. 4 is a schematic diagram illustrating an exemplary charging scheduling model according to some embodiments of the present disclosure.

FIG. 4 is schematic diagram illustrating an exemplary charging scheduling model according to some embodiments of the present disclosure.

In some embodiments, a processor may determine, based on a charging priority 410 of each charging demand, a completion degree 451 and a completion efficiency 452 of each charging demand in a candidate charging scheduling parameter 432 through a charging scheduling model 400. The charging scheduling model is a machine learning model.

The candidate charging scheduling parameter 432 refers to an alternative charging scheduling parameter for scheduling a target user to perform charging. For more contents on the charging scheduling parameter, please refer to FIG. 1 and the associated descriptions.

The charging scheduling model 400 refers to a prediction model for determining the completion degree and the completion efficiency of the candidate charging scheduling parameter. In some embodiments, the charging scheduling model is the machine learning model.

In some embodiments, the charging scheduling model 400 may include a candidate strategy generation layer 420 and a completion expectation evaluation layer 440. The candidate strategy generation layer 420 may be a deep neural networks (DNN) model, the completion expectation evaluation layer 440 may be the DNN model, etc.

In some embodiments, an input of the candidate strategy generation layer 420 includes a plurality of charging priorities 410 for each charging demand, and an output includes a plurality of candidate charging scheduling parameters 432. An input to the completion expectation evaluation layer 440 includes the plurality of candidate charging scheduling parameters 432, a plurality of charging demands 431, and an environmental feature 433, and an output includes, among the candidate charging scheduling parameters, the completion degree 451 and the completion efficiency 452 of each of the charging demands.

The plurality of charging priority 410 of the charging demand may correspond to one priority sequence, e.g., elements in the priority sequence may be: after sorting all the charging piles in a preset sequence, a sequential arrangement of the charging priority of the current charging demand at each of the charging piles. For charging piles that are not under consideration for the charging demand, the charging priority of the charging demand at the charging piles may be a preset value, for example, 0.

The completion degree 451 may reflect a situation of the charging demand being met under the corresponding candidate charging scheduling parameter. In some embodiments, the completion degree may be a ratio of an actual charging volume corresponding to the charging demand to the demand power under the corresponding candidate charging scheduling parameter.

The completion efficiency 452 may reflect an actual charging time corresponding to the charging demand under the corresponding candidate charging scheduling parameter.

In some embodiments, the output of the candidate strategy generation layer 420 may be used as the input to the completion expectation evaluation layer 440. The candidate strategy generation layer and the completion expectation evaluation layer may be obtained through separate training or joint training.

In some embodiments, the processor 140 may train the candidate strategy generation layer 420 based on a great number of first training samples. The first training samples include a plurality of groups of training data with first labels, each group of training data including a plurality of sample charging priorities for historical sample charging demands. Each group of training data may be represented in a form of a charging priority vector. For example, the processor may obtain a plurality of historical charging priorities for the charging demand of each historical sample based on historical data, construct a corresponding priority sequence, and construct a charging priority vector based on the priority sequence.

In some embodiments, the first label may be a plurality of sample candidate charging scheduling parameters corresponding to sample historical charging demands in the group of training data. The first label may be obtained based on clustering.

In some embodiments, the processor may determine a plurality of clusters by clustering the charging priority vectors corresponding to all training data in the first training samples via a clustering algorithm. Each cluster includes at least one charging priority vector. There may be a plurality of types of clustering algorithms, e.g., a K-Means (K-means) clustering, a density-based spatial clustering of applications with noise (DBSCAN), etc.

In some embodiments, the processor may use all the historical sample charging demands corresponding to all the charging priority vectors in the same cluster as labeled source demands of the training data included in the cluster. The processor may construct a candidate charging scheduling parameter based on an actual historical target charging pile and an actual historical target charging sequence of each historical sample charging demand, and the processor may obtain the plurality of candidate charging scheduling parameters based on all the historical sample charging demands of the labeled source demands.

In some embodiments, the plurality of candidate charging scheduling parameters corresponding to a plurality of training data in a cluster may be the same, i.e., the plurality of candidate charging scheduling parameters constructed based on all historical sample charging demands of the labeled source demands for that cluster may be the same. That is, the first labels of the plurality of training data in one cluster may be the same, the first labels being the plurality of candidate charging scheduling parameters constructed based on all historical sample charging demands of the labeled source demands of the cluster.

In some embodiments, the processor 140 may train the completion expectation evaluation layer 440 based on a great count of second training samples with second labels. The second training samples may include the sample candidate charging scheduling parameters, a plurality of sample charging demands, and a plurality of sample environmental features. The second labels may be sample completion degrees and sample completion efficiencies for each sample charging demand under the sample candidate charging scheduling parameters of the second training samples.

The second training samples may be obtained based on the historical data, and the second labels may be determined based on manual labeling. For example, the processor may obtain a plurality of groups of historical charging scheduling parameters based on the historical data, and determine the plurality of groups of historical charging scheduling parameters as a plurality of groups of sample candidate charging scheduling parameters. The each historical charging demand in the historical charging scheduling parameters is used as each of a plurality of sample charging demands in the second training samples, and a historical environmental feature corresponding to the historical charging scheduling parameter is used as the sample environmental feature.

The processor 140 may also determine a historical completion degree of each historical charging demand under the corresponding historical charging scheduling parameter based on the ratio of the actual charging volume of each historical charging demand to the demand power of each historical demand; and determine a historical completion efficiency of the corresponding historical charging demand under the corresponding historical charging scheduling parameter based on a historical charging start time and a historical charging termination time of each historical charging demand under the corresponding historical charging scheduling parameter; and determine the historical completion degree and the historical completion efficiency as the second labels corresponding to each of the second training samples.

In some embodiments, the candidate strategy generation layer 420 and the completion expectation evaluation layer 440 may be obtained through joint training. Exemplarily, a joint training process may include: inputting a plurality of sets of training data included in the first training sample into an initial candidate strategy generation layer to obtain a plurality of candidate charging scheduling parameters output by the initial candidate strategy generation layer; constructing the second training samples based on each charging demand corresponding to the charging priority of each charging demand in the first training sample, as well as the environmental feature when processing the each charging demand; inputting the second training samples into an initial completion expectation evaluation layer, and obtaining the completion degree as well as the completion efficiency of each charging demand in the candidate charging scheduling parameter output from the initial completion expectation evaluation layer. A loss function is constructed based on the completion degree and the completion efficiency output from the initial completion expectation evaluation layer with the second labels, and model parameters of the initial candidate strategy generation layer and the initial completion expectation evaluation layer are updated. The training is completed when the loss function satisfies a preset condition, and the trained charging scheduling model is obtained. The preset condition may be that the loss function converges, a count of iterations reaches a threshold, etc.

In some embodiments, the candidate strategy generation layer 420 and the completion expectation evaluation layer 440 may be obtained by separate training. Exemplarily, the processor may input a plurality of first training samples with first labels into the initial candidate strategy generation layer, construct a loss function from the first labels and the output of the initial candidate strategy generation layer, and iteratively update parameters of the initial candidate strategy generation layer based on the loss function. The model training is completed when the loss function of the initial candidate strategy generation layer satisfies a preset condition, and a trained candidate strategy generation layer is obtained. The preset condition may be that the loss function converges, the count of iterations reaches a threshold, etc.

Specific training steps for training the completion expectation evaluation layer may be found in related contents on training the candidate strategy generation layer above.

In some embodiments, the charging scheduling model 400 may be trained based on a plurality of groups of training datasets, and each of the plurality of groups of training datasets includes a plurality of training samples with labels; one group of training datasets corresponds to one sample collection time; a count of the training samples in each of the plurality of groups of training dataset is not less than a preset count threshold; and the preset count threshold is related to a total count of charging piles and a frequency of generation of the charging demand.

The training dataset is a dataset used to train the charging scheduling model. In some embodiments, different groups of training datasets may correspond to different sample collection times. In some embodiments, the training dataset may include the first training sample, the second training sample, and corresponding first labels, and second labels collected at the same sample collection time. More contents about the training samples and the training labels may be found above.

The sample collection time refers to a data collection time for obtaining data related to the training sample. In some embodiments, the processor may divide a time period to obtain a plurality of groups of collection times. For example, the processor may take a week as the time period, and an hour as a time period length for division, and obtain 7*24 groups of sample collection times. In some embodiments, the processor may use sample data collected based on the same group of sample collection times as the training samples in the same training dataset.

In some embodiments, in order to ensure a diversity of the training data and to avoid an insufficient generalization of the charging scheduling model, the count of training samples included in each set of the training dataset is not less than a preset count threshold.

In some embodiments, the preset count threshold correlates to the total count of charging piles and the frequency of generation of the charging demand. For example, the preset count threshold is positively correlated to the total count of charging piles as well as the frequency of generation of the charging demand. The greater the total count of charging piles, and the greater the frequency of generation of the charging demand, the more complex a generating scheduling for the current region, the greater the difficulty in generating the charging scheduling parameter, and the higher degree of a generalizability is required for the model, so as to obtain more accurate completion degree and completion efficiency of the charging demand at different times.

In some embodiments of the present disclosure, the charging demand is usually affected by a time factor as the target user tends to have different charging demand during different time periods such as weekdays and holidays, daytime and nighttime. By ensuring that the count of training samples with a same temporal classification value is not lower than a preset count threshold, the diversity of the training samples may be effectively ensured, thereby avoiding the situation that the model is unable to accurately predict the data of other time periods due to a concentration of the training samples in a specific time range, thereby improving the generalizability of the model.

In some embodiments, the processor 140 may determine a preferred charging scheduling parameter based on the candidate charging scheduling parameter 432, and the completion degree 451 and completion efficiency 452 of the charging demand of the candidate charging scheduling parameter.

In some embodiments, the processor 140 may determine the preferred charging scheduling parameter in multiple ways. For example, the processor may determine, for each candidate charging scheduling parameter, an average value of completion degree, a variance of completion degree, a mean average value of completion efficiency, and a variance of completion efficiency corresponding to the plurality of charging demands, and obtain a score for the candidate charging scheduling parameter based on the above average values and variances, and select the candidate charging scheduling parameter with the highest score as the preferred charging scheduling parameter.

In some embodiments, the scores of the candidate charging scheduling parameters may be positively correlated to the average value of the completion degree, the average value of the completion efficiency; and negatively correlated with the variance of completion degree, and the variance of completion efficiency.

In some embodiments, the processor 140 may determine the score for the candidate charging scheduling parameter via formula (3):

$$B = k_1 \times W + \frac{k_2}{X} + k_3 \times Y + \frac{k_4}{Z} \tag{3}$$

where, B denotes the score of the candidate charging scheduling parameter, W, X, Y, and Z denotes the average value of the completion degree, the variance of the completion degree, the average value of the completion efficiency, and the variance of the completion efficiency under the candidate charging scheduling parameter, respectively, and $k_1$, $k_2$, $k_3$, and $k_4$ denotes the coefficients of the average value of the completion degree, the variance of the completion degree, the average value of the completion efficiency, and the variance of the completion efficiency. The coefficients $k_1$, $k_2$, $k_3$, and $k_4$ may be determined according to a priori experience.

In some embodiments of the present disclosure, the completion degree and the completion efficiency of each charging demand among the candidate charging scheduling parameters is determined by the charging scheduling model, and the preferred charging scheduling parameter is further determined. A data analysis capability of the machine learning model as well as a data processing capability may be utilized to quickly and accurately screen the candidate charging scheduling parameter with best scheduling result.

Figure 5:
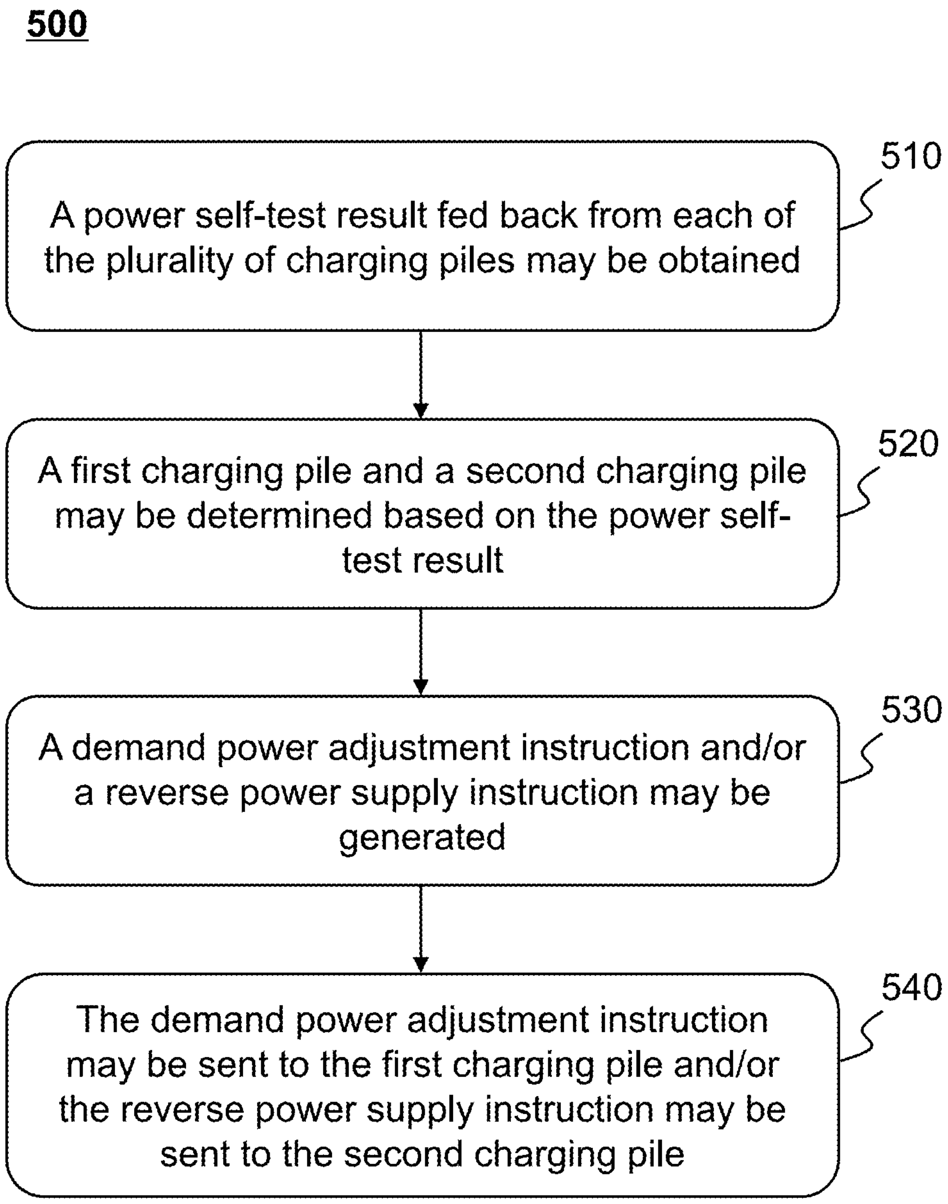
FIG. 5 is a flowchart illustrating an exemplary process for determining the first charging pile and the second charging pile and subsequent processes according to some embodiments of the present disclosure.

FIG. 5 is a flowchart illustrating an exemplary process for determining the first charging pile and the second charging pile and subsequent processes according to some embodiments of the present disclosure.

In 510, a power self-test result fed back from each of the plurality of charging piles may be obtained.

The power self-test result refers to a result obtained by the charging pile performing a correction check on its own stored power after receiving the power self-test instruction. In some embodiments, the power self-test result may include an amount of power remaining of the charging pile.

In 520, a first charging pile and a second charging pile may be determined based on the power self-test result.

The first charging pile refers to a charging pile in which the amount of power remaining in an electrical energy storage unit exceeds a first threshold and is less than a second threshold. The second charging pile refers to a charging pile that has a sufficient amount of power remaining that is not less than the second threshold.

The first threshold and the second threshold are thresholds that reflect the amount of power remaining of the charging pile. In some embodiments, the second threshold is greater than the first threshold.

In some embodiments, the processor 140 may determine a first power threshold and a second power threshold in a variety of ways, thereby determining the first charging pile and the second charging pile. The first power threshold as well as the second power threshold corresponding to different charging piles may be the same or different.

In some embodiments, the processor 140 may determine the first power threshold and the second power threshold based on a current electrical power output externally from the each charging pile and an environmental feature. For example, the first power threshold and the second power threshold may be positively correlated to the current power output externally from the each charging pile, and negatively correlated to a statistics of a light intensity sequence for a preset future time period in the future. The greater the current electrical power output externally from the charging pile, the greater a decrease in the amount of power remaining, and the smaller the statistical value (e.g., the average value) of the light intensity sequence for the preset future time period, indicating that the light intensity is insufficient in the future period, making it difficult for the charging pile to replenish the power in a timely manner. As a result, the first power threshold as well as the second power threshold may be properly increased to ensure that the first charging pile and the second charging pile do not run out of power within a short time period, thus ensuring an accuracy of a result.

In some embodiments, the processor 140 may also determine the first threshold and the second threshold based on the current power supply of each charging pile and an environmental feature sequence, via a threshold prediction model.

The threshold prediction model is a prediction model for determining the first threshold and the second threshold. In some embodiments, the threshold prediction model is a machine learning model. For example, the threshold prediction model may be a DNN model.

In some embodiments, an input of the threshold prediction model may include a current electrical power output externally from the each charging pile, and the environmental feature sequence for a future preset time period. An output may include the first threshold as well as the second threshold.

In some embodiments, the input to the threshold prediction model also includes a grid demand power for each charging pile at the current moment. For more detailed description of the grid demand power, please refer to FIG. 1 and the associated descriptions.

In some embodiments of the present disclosure, as the charging pile relies on its own amount of power remaining as well as a photovoltaic power generation, which is sometimes insufficient to provide enough power, a portion of the power from the grid is required. Therefore, using the grid demand power as an additional input to the threshold prediction model is conducive to improving an accuracy and adaptability of the threshold prediction model, thereby obtaining a more accurate prediction result.

In some embodiments, the threshold prediction model may be obtained by training based on a third training sample as well as a third label.

In some embodiments, the third training sample may include a sample electrical power output externally from the sample charging pile at a first moment, a sample grid demand power at the first moment, and a sample environmental feature sequence at a second time period. For more contents of the environmental feature sequence, please refer to FIG. 1 and the associated descriptions. The first moment precedes the second time period.

In some embodiments, the third label may be a sample first threshold and a sample second threshold corresponding to the sample charging pile of the third training sample. In some embodiments, the third training sample may be obtained based on historical data. For example, the processor may divide the historical data according to a preset time period to obtain a plurality of preset scale datasets, and each preset scale dataset is a collection formed by historical data for the preset time period. The preset time period may be in days or hours.

In some embodiments, the processor may evaluate a scheduling effect value for each preset scale dataset. The scheduling effect value for each preset scale dataset is determined based on a first frequency, a second frequency, and a third frequency corresponding to the preset scale dataset.

The scheduling effect value refers to a score used to reflect the scheduling effect of a preset scale dataset. The scheduling effect value may be negatively correlated to the first frequency, the second frequency, and the third frequency corresponding to the preset scale dataset.

The first frequency refers to a count of times the processor generates a demand power adjustment instruction as well as a reverse power supply instruction within a preset time range of the preset scale dataset. Further description of the demand power adjustment instruction as well as the reverse power supply instruction may be found below.

The second frequency refers to an abnormal count of times that the sample charging pile stops supplying power due to insufficient amount of power remaining within a preset time range of the preset scale dataset.

In some embodiments, when the amount of power remaining of the sample charging pile is insufficient, the charging may also rely on the photovoltaic power generation as well as the power supply from the grid. When the photovoltaic power generation power as well as the grid demand power is too low, the current charging pile is unable to supply power normally, and an abnormality occurs.

The third frequency refers to a count of times premium charging occurs within a preset time range of the preset scale dataset. In some embodiments, as a cost of electricity of the grid typically fluctuates over time, a peak time period when the cost of electricity is high and a valley time period when the cost of electricity is low usually exist. An act of charging relying on the grid for a great amount of power supply during the peak time period that results in the user spending too much money on charging is called the premium charging.

In some embodiments, the processor may use the count of times that the grid demand power of the sample charging pile is greater than the preset grid demand power threshold during the peak time period corresponding to the preset time range of the preset scale dataset as the third frequency. The time range of the peak time period may be set based on the priori experience.

In some embodiments, the processor may determine each preset scale dataset scheduling effect value via formula (4):

$$T = k_1/P_1 + k_2/P_2 + k_3/P_3 \quad (4)$$

where, T denotes the scheduling effect value, $P_1$, $P_2$, and $P_3$ denotes the first frequency, the second frequency, and the third frequency, respectively, of historical data for the preset time period, and $k_1$, $k_2$, and $k_3$ are coefficients. The coefficients $k_1$, $k_2$, and $k_3$ may be determined based on the priori experience.

In some embodiments, the processor may screen the preset scale dataset whose scheduling effect value is greater than a preset scheduling effect threshold to be a target scale dataset, and determine the externally output electric power at a certain moment in time in the target scale dataset, the grid demand power at that moment, and the environmental feature sequence corresponding to the time range after that moment as a third training sample. The first threshold and the second threshold that are actually set in the target scale dataset are used as third labels corresponding to the third training sample generated based on the target scale dataset. A plurality of third training samples and their corresponding third labels may be obtained by performing the aforementioned processing to a plurality of target scale datasets.

In some embodiments, the processor may perform training based on the third training sample and the third label to obtain the threshold prediction model. Training the threshold prediction model is similar to the training of the charging scheduling model, as may be seen in FIG. 4 and the related descriptions.

In some embodiments of the present disclosure, by determining the first threshold and the second threshold using the threshold prediction model, the most appropriate first threshold and second threshold may be quickly and accurately screen by utilizing the data analysis capability as well as the data processing capability of the machine learning model.

In 530, a demand power adjustment instruction and/or a reverse power supply instruction may be generated.

The demand power adjustment instruction refers to an instruction to reduce the grid demand power of the first charging pile. The reverse power supply instruction refers to an instruction to control the power supply to the grid from the second charging pile.

In some embodiments, the processor may determine the grid demand power of the first charging pile based on an amount of power available of the first charging pile and an average charging duration of a target user, which in turn generates the demand power adjustment instruction.

For any first charging pile, the processor may determine a power gap of the charging pile based on a required power of the target charging demand of the charging pile and the amount of power available at the charging pile; the processor may further determine the grid demand power of the charging pile based on the power gap of the charging pile and the average charging duration of the target user corresponding to each target charging demand. A difference between the grid demand power and the photovoltaic power generation is determined as the demand power adjustment instruction, which is sent to the first charging pile.

In order to ensure the accuracy of the grid demand power, the grid demand power of the charging pile needs to be re-determined after each charging demand is completed; and the average charging duration of the user corresponding to each charging demand may be obtained based on statistical historical data.

Exemplarily, the demand power adjustment instruction may be: to adjust downwardly the current grid demand power of the charging pile, and a magnitude of the downward adjustment is the difference between the grid demand power and the photovoltaic power generation.

For any one of the second charging piles, the processor may determine the reverse power supply instruction for the charging pile based on the amount of power remaining of the charging pile and the corresponding second threshold.

Exemplarily, the demand power adjustment instruction may be: to supply the power stored in the charging pile that exceeds the first threshold to the power grid.

In 540, the demand power adjustment instruction may be sent to the first charging pile and/or the reverse power supply instruction may be sent to the second charging pile.

In some embodiments of the present disclosure, by generating the demand power adjustment instruction and/or the reverse power supply instruction, when the photovoltaic power generation is capable of maintaining an operation of the charging pile, the power supplied by the power grid, as well as the additional cost therefrom are reduced. And when the photovoltaic power generation power is high, a portion of the power may be used to deliver power to the power grid, which avoids wasting the photovoltaic power and also provides an economic benefit.

In some embodiments, the processor 140 may feedback the power self-test result to the processor during a preset self-test time period in accordance with a preset self-test cycle corresponding to the preset self-test cycle of the preset self-test cycle. The preset self-test period of the charging pile during the preset self-test time period is related to a historical grid demand power of the charging pile.

The preset self-test time period refers to a time range in which the power self-test needs to be performed according to the corresponding preset self-test cycle. A length of the preset self-test time period may be preset based on the priori experience.

In some embodiments, the preset self-test time period of a non-peak time period may be greater than the preset self-test time period of the peak time period.

The preset self-test cycle refers to a cycle of the power self-test of the charging pile during the corresponding preset self-test time period. The preset self-test cycle of the each preset self-test time period may be determined based on the historical grid demand power of its historical preset self-test cycle (e.g., a previous preset self-test cycle).

In some embodiments, the preset self-test cycle of the current preset self-test time period may be positively correlated to the grid demand power of the charging pile during the previous preset self-test time period. For example, a greater the grid demand power indicates that the photovoltaic power generation of the charging pile is unable to provide enough power, and at this time, the required power is mainly provided by the grid, and thus the subsequent preset self-test cycle may be appropriately increased, which reduces a power waste due to power self-test.

In some embodiments of the present disclosure, as the grid demand power is usually updated after the completion of the charging demand, there may be a situation when the charging pile is charging after a long period of idleness and the charging pile has not yet performed a self-test. At this time, a deviation may occur to the grid demand power. The above situation may be effectively avoided by setting the preset self-test cycle corresponding to a preset self-test time period to perform the power self-test in time.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. These types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. Such as "an embodiment," "an embodiment," and/or "some embodiments" means a feature, structure, or characteristic associated with at least one embodiment of the present disclosure. Accordingly, it should be emphasized and noted that "one embodiment" or "an embodiment" or "an alternative embodiment" in different places in the present disclosure do not necessarily refer to the same embodiment. In addition, certain features, structures, or characteristics of one or more embodiments of the present disclosure may be suitably combined.

Furthermore, unless expressly stated in the claims, the order of the processing elements and sequences, the use of numerical letters, or the use of other names as described in the present disclosure are not intended to qualify the order of the processes and methods of the present disclosure. While some embodiments of the invention that are currently considered useful are discussed in the foregoing disclosure by way of various examples, it is to be understood that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or a description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers describing the number of components, attributes, and it should be understood that such numbers used in the description of embodiments are modified in some examples by the modifiers "approximately," "nearly," or "substantially." Unless otherwise noted, the terms "about," "approximate," or "approximately" indicate that a ±20% variation in the stated number is allowed. Correspondingly, in some embodiments, the numerical parameters used in the present disclosure and claims are approximations, which may change depending on the desired characteristics of individual embodiments. In some embodiments, the numerical parameters should consider the specified number of valid digits and utilize a general digit retention method. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appurtenant to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A charging pile coordination system, comprising a user terminal provided with a first positioning unit, a plurality of charging pile s, an environmental monitoring unit, and a processor; wherein the user terminal is connected to at least one charging pile of the plurality of charging piles; the user terminal is configured to obtain a charging demand of a user and user information; and the first positioning unit is configured to obtain a terminal position of the user terminal;

each of the plurality of charging piles includes a solar power generating unit, an electrical energy storage unit, and a second positioning unit; the second positioning unit is configured to obtain a charging pile position of the charging pile;

the environmental monitoring unit is configured to obtain an environmental feature of a region where the charging pile is located;

the processor is communicatively connected to the user terminal and the charging pile; and the processor is configured to:

for each of the plurality of charging piles, obtain a power generation parameter of the solar power generating unit;

determine a predicted efficiency of the solar power generating unit for a preset future time period and a confidence level for the predicted efficiency based on the environmental feature and the power generation parameter;

determine an amount of power available from the charging pile for the preset future time period based on the predicted efficiency, the confidence level for the predicted efficiency, and an amount of power remaining in the electrical energy storage unit;

determine a preferred charging scheduling parameter based on the amount of power available, the charging pile position, and the charging demand corresponding to the plurality of charging piles; the preferred charging scheduling parameter including a target charging pile and a target charging sequence corresponding to the charging demand;

generate a first scheduling instruction, a second scheduling instruction, and notification information based on the preferred charging scheduling parameter; wherein the first scheduling instruction is configured to set a grid demand power of the plurality of charging piles for the preset future time period; the second scheduling instruction is configured to adjust a monitoring parameter of the environmental monitoring unit; and the notification information includes the target charging pile and the target charging sequence corresponding to the charging demand; and send the first scheduling instruction to the plurality of charging piles, send the second scheduling instruction to the environmental monitoring unit, and send the notification information to the user terminal.

2. The system of claim 1, wherein the user information includes a user position of the user corresponding to the charging demand; the processor is further configured to:

determine a charging distance between the each charging pile and the user corresponding to the charging demand based on the user position and the charging pile positions of the plurality of charging piles;

determine a charging priority of the charging demand at the each charging pile based on the amount of power available corresponding to the each charging pile and the charging distance; and determine the target charging pile and the target charging sequence corresponding to the charging demand based on the charging priority of the charging demand at the each charging pile.

3. The system of claim 2, wherein the processor is further configured to:

determine a completion degree and completion efficiency of the charging demand in a candidate charging scheduling parameter based on the charging priority of the charging demand through a charging scheduling model; the charging scheduling model being a machine learning model; and determine the preferred charging scheduling parameter based on the candidate charging scheduling parameter, and the completion degree and completion efficiency of the charging demand in the candidate charging scheduling parameter.

4. The system of claim 3, wherein the charging scheduling model is obtained by training based on a plurality of groups of training dataset s, wherein each of the plurality of groups of training datasets includes a plurality of training samples with labels; one group of training datasets corresponds to one sample collection time; a count of the training samples in each of the plurality of groups of training datasets is not less than a preset count threshold; and the preset count threshold is related to a total count of the charging piles and a frequency of generation of the charging demand.

5. The system of claim 2, wherein the processor is further configured to:

in response to receiving a charging pile request instruction from the user terminal, send a power self-test instruction to the target charging pile in the charging pile request instruction.

6. The system of claim 5, wherein the processor is further configured to:

in response to receiving the charging pile request instruction, send the power self-test instruction to a candidate charging pile; wherein a distance between the candidate charging pile and the target charging pile does not exceed a preset distance threshold; the preset distance threshold is determined based on a count of habitual charging pile s of a target user; and the target user is a user initiating the charging pile request instruction.

7. The system of claim 1, wherein the processor is further configured to:

obtain a power self-test result fed back from each of the plurality of charging piles;

determine a first charging pile and a second charging pile based on the power self-test result; wherein the first charging pile is a charging pile whose amount of power remaining in the electrical energy storage unit exceeds a first threshold and is less than a second threshold, and the second charging pile is a charging pile whose amount of power remaining is not less than the second threshold;

generate a demand power adjustment instruction and/or a reverse power supply instruction; wherein the demand power adjustment instruction is configured to reduce the grid demand power of the first charging pile, and the reverse power supply instruction is configured to control the second charging pile to supply power to a power grid; and send the demand power adjustment instruction to the first charging pile and/or send the reverse power supply instruction to the second charging pile.

8. The system of claim 7, wherein the processor is further configured to:

determine the first threshold and the second threshold based on a current power supply of the each charging pile and an environmental feature sequence by a threshold prediction model, the threshold prediction model being a machine learning model.

9. The system of claim 8, wherein an input to the threshold prediction model includes a grid demand power of the each charging pile at a current moment.

10. The system of claim 7, wherein each of the plurality of charging piles is further configured to: during a preset self-test time period, feedback the power self-test result to the processor in accordance with a preset self-test cycle corresponding to the preset self-test time period, wherein the preset self-test cycle of the charging pile during the preset self-test time period is related to a historical grid demand power of the charging pile.

11. A method for charging pile coordination, wherein the method is performed based on a processor, the method comprises:

for at least one of a plurality of charging piles, obtaining a power generation parameter of a solar power generating unit in the charging pile and an environmental feature of a region where the charging pile is located;

determining a predicted efficiency of the solar power generating unit for a preset future time period and a confidence level for the predicted efficiency based on the environmental feature and the power generation parameter;

determining an amount of power available from the charging pile for the preset future time period based on the predicted efficiency, the confidence level for the predicted efficiency, and an amount of power remaining in an electrical energy storage unit;

obtaining a charging demand of a user and user information based on a user terminal;

obtaining a terminal position of the user terminal based on a first positioning unit in the user terminal;

determining a preferred charging scheduling parameter based on the amount of power available, the charging pile position, and the charging demand corresponding to the plurality of charging piles; the preferred charging scheduling parameter including a target charging pile and a target charging sequence corresponding to the charging demand;

generating a first scheduling instruction, a second scheduling instruction, and notification information based on the preferred charging scheduling parameter, wherein the first scheduling instruction is configured to set a grid demand power of the plurality of charging piles for the preset future time period, the second scheduling instruction is configured to adjust a monitoring parameter of an environmental monitoring unit, and the notification information includes the target charging pile and the target charging sequence corresponding to the charging demand; and sending the first scheduling instruction to the plurality of charging piles, sending the second scheduling instruction to the environmental monitoring unit, and send the notification information to the user terminal.

12. The method of claim 11, wherein the user information further includes a user position of the user corresponding to the charging demand;

the determining a preferred charging scheduling parameter based on the amount of power available, the charging pile position, and the charging demand corresponding to the plurality of charging piles further includes:

determining a charging distance between the each charging pile and the user corresponding to the charging demand based on the user position and the charging pile positions of the plurality of charging piles;

determining a charging priority of the charging demand at the each charging pile based on the amount of power available corresponding to the each charging pile and the charging distance; and determining the target charging pile and the target charging sequence corresponding to the charging demand based on the charging priority of the each charging demand at the each charging pile.

13. The method of claim 12, wherein the determining the target charging pile and the target charging sequence for the each charging demand based on the charging priority of the each charging demand at the each charging pile includes:

determining a completion degree and completion efficiency of the charging demand in a candidate charging scheduling parameter based on the charging priority of the charging demand through a charging scheduling model; the charging scheduling model being a machine learning model; and determining the preferred charging scheduling parameter based on the candidate charging scheduling parameter, and the completion degree and completion efficiency of the charging demand in the candidate charging scheduling parameter.

14. The method of claim 12, wherein the method further includes:

in response to receiving a charging pile request instruction from the user terminal, sending a power self-test instruction to the target charging pile in the charging pile request instruction.

15. The method of claim 14, wherein the method further includes:

in response to receiving the charging pile request instruction, sending the power self-test instruction to a candidate charging pile; wherein a distance between the candidate charging pile and the target charging pile does not exceed a preset distance threshold; the preset distance threshold is determined based on a count of habitual charging piles of a target user; and the target user is a user initiating the charging pile request instruction.

16. The method of claim 11, wherein the method further includes:

obtaining a power self-test result fed back from each of the plurality of charging piles;

determining a first charging pile and a second charging pile based on the power self-test result; wherein the first charging pile is a charging pile whose amount of power remaining in the electrical energy storage unit exceeds a first threshold and is less than a second threshold, and the second charging pile is a charging pile whose amount of power remaining is not less than the second threshold;

generating a demand power adjustment instruction and/or a reverse power supply instruction; wherein the demand power adjustment instruction is configured to reduce the grid demand power of the first charging pile, and the reverse power supply instruction is configured to control the second charging pile to supply power to a grid; and sending the demand power adjustment instruction to the first charging pile and/or send the reverse power supply instruction to the second charging pile.

17. The method of claim 16, wherein the method further includes:

determining the first threshold and the second threshold based on a current power supply of the each charging pile and an environmental feature sequence by a threshold prediction model, the threshold prediction model being a machine learning model.

18. The method of claim 17, wherein an input to the threshold prediction model includes a grid demand power of the each charging pile at a current moment.

19. The method of claim 16, wherein the obtaining a power self-test result fed back from each of the plurality of charging piles further includes:

during a preset self-test time period, feeding back the power self-test result to the processor in accordance with a preset self-test period corresponding to the preset self-test time period, wherein the preset self-test period of the charging pile during the preset self-test time period is related to a historical grid demand power of the charging pile.

20. A non-transitory computer-readable storage medium storing computer instruction, wherein when reading the computer instructions in the storage medium, a computer executes the charging pile coordination method according to claim 11.

* * * * *